Patented Feb. 19, 1935

1,991,646

UNITED STATES PATENT OFFICE 1,991,646

MANUFACTURE OF AROMATIC SELENIUM COMPOUNDS

Alexander J. Wuertz, Carrollville, Donald P. Graham, South Milwaukee, and Melvin A. Perkins, Milwaukee, Wis., assignors to E. I. du Pont de Nemours & Company, Wilmington, Del., a corporation of Delaware No Drawing. Application March 27, 1933, Serial No. 662,996

14 Claims. (Cl. 260—61)

This invention relates to the manufacture of aromatic selenium compounds. More particularly, this invention deals with an improved process for the manufacture of aromatic selenols and related compounds by replacement of halogen in aromatic halogen compounds by selenium. It is an object of this invention to provide an economical and efficient process for the manufacture of aromatic selenols and selenolates. Other and further important objects of this invention will appear as the description proceeds.

Of the aromatic selenols and diselenides, those of the anthraquinone and benzanthrone series are of particular commercial interest. We shall therefore confine our discussion hereinafter to these compounds and designate them generically as compounds of the anthraquinone series. But it should be understood that our invention is of a general nature, and applies to the manufacture of other aromatic selenols and diselenides, where a halogen atom on the aromatic nucleus is replaced by selenium.

The manufacture of anthraquinone selenols was first described in German Patent No. 264,941. This patent proposed to use sodium or potassium selenide as the selenizing agent, and in turn obtained this agent by passing hydrogen selenide into an aqueous alcoholic solution of sodium or potassium hydroxide. The disadvantage in this process is that it requires generation of hydrogen selenide which is a highly poisonous gas. It appears also that this process consumes three times as much selenium as actually combines with the anthraquinone nucleus, and is therefore wasteful and costly.

In copending applications, Perkins and Bishop, Ser. No. 627,222, and Perkins, Ser. No. 661,583, it is proposed to manufacture the required sodium selenide in situ, by feeding in gradually a metal which stands high in the electromotive series into an aqueous or alcoholic aqueous mixture containing the organic halide to be selenized, elemental selenium and caustic soda. In the former of the two applications this process is applied to the manufacture of 2-amino-anthraquinone-1-selenols; in the latter, to the manufacture of Bzl-benzanthrone-selenols. The reducing metal employed is either sodium or aluminum. This process constitutes a considerable improvement over the process of German Patent No. 264,941, but it still suffers from the drawback that in large scale operation the yields are not so high as would be expected from the indications of laboratory experiments.

We have investigated this process and found that a great deal of the trouble is apparently due to the fact that the added metal generates hydrogen rapidly, which buoys up the metal, causing it to float on the surface of the charge and preventing it from getting intimately mixed with the selenium. Another cause for difficulty is the action of the highly concentrated alkali on the halogen-anthraquinone or -benzanthrone body, splitting off halogen, and converting the organic body into a form which is less readily attacked by sodium selenide.

In the same copending applications is also disclosed a process involving first the formation of alkali-metal selenide in aqueous or alcoholic-aqueous suspension and then adding the organic halide. This process, however, is not very satisfactory either, for the reason that sodium and potassium selenide are highly unstable bodies and tend to form complex polyselenides which are not very active as selenizing agents.

We have now invented a new process of operation which obviates all the above difficulties and gives excellent yields on a large scale as well as in the laboratory. Our novel process has the further advantage that it works well with the simpler aryl-halogen derivatives, for instance, 1- or 2-halogenanthraquinones, whereas the processes of the mentioned copending applications are not applicable to such simple compounds. Our novel process also has the advantages of facility of control and reduced hazard of operation.

According to our novel process, the halogenated aromatic compound in which it is desired to replace the halogen with selenium, is slurried in alcohol, alcohol mixed with water, or water alone, together with powdered selenium or selenium oxide, and aluminum in a sufficiently fine state of division to avoid settling, preferably in the form of grains passing a 10 but not a 20 mesh screen. This mixture is agitated at 60–80° C. and a solution of an alkali hydroxide is added over a period of several hours. This accomplishes the same result as those processes in which the reducing metal is added to the alkaline slurry of the halogenated intermediate and selenium, but avoids the possibility of concentration of the reducing metal near the surface of the charge and also eliminates the undesirable effects of excess alkali on the intermediate. The sodium aluminate formed during the first part of the reaction together with aluminum hydroxide serve to stabilize the alkalinity of the charge at a point below that capable of damaging the intermediate and it is only after the aluminum is all consumed and the intermediate converted to the selenol that the alkalinity reaches an appreciable value. These relationships are readily adjusted to suit the requirements of the particular reaction by selecting the relative quantities of the reactants required on a stoichiometric basis.

Without limiting our invention to any particular procedure, the following examples in which parts by weight are given will serve to illustrate our preferred mode of operation.

Example 1

A mixture of 100 parts of 1-chlor-2-aminoanthraquinone, 33.3 parts of selenium powder, and 11 parts of aluminum (powder or grains) is suspended in 280 parts of alcohol and 100 parts of water. The suspension is heated to 70–75° C. and at this temperature, a solution of 83 parts of sodium hydroxide in 166 parts of water is added over a period of from 2 to 6 hours. The charge is then refluxed at 75–80° C. for 2 hours or until a sample on a microscope slide shows no more yellow material. It is then salted with 500 parts of saturated salt solution, allowed to cool to room temperature, and filtered. The cake is washed with a 15 per cent salt solution until the filtrate is clear. The product, 2-aminoanthraquinone-1-sodium selenolate is isolated in the form of dark blue needles soluble in water to give a blue-violet solution. It may be oxidized to 2,2'-diamino-1,1'-dianthraquinonyl diselenide by the action of air on a water suspension of the selenolate or by the use of some other oxidizing agent such as nitrobenzene-meta-sodium-sulfonate. The diselenide may also be prepared by oxidizing directly the reflux mass prior to and in lieu of salting out. In either case, the diselenide precipitates and is isolated by filtration, whereupon it is washed neutral and dried. It is an orange powder crystallizing in curved needles, soluble in sulfuric acid, giving a straw colored solution.

Example 2

A mixture of 242 parts of 1-chloro-anthraquinone, 87 parts selenium powder, and 30 parts aluminum (grains) is suspended in 1000 parts ethyl alcohol and the suspension warmed to about 70° C. While maintaining the temperature at 70–78° C., and under good agitation, a solution of 350 parts potassium hydroxide in 800 parts of water is added at a uniform rate over a period of about four hours. The mass is then refluxed for about one hour longer, or until no crystals of unchanged 1-chloro-anthraquinone are visible in a test sample under the microscope. At this point, the potassium anthraquinone selenolate may be isolated by salting out (KCl) and washing. A preferred procedure, however, is to convert the mass directly into the diselenide and to isolate the latter. For this purpose the reaction mass is diluted with water and oxidized by blowing air through the same, or by adding a mild oxidizing agent such as potassium ferricyanide. In either case a bright orange yellow solid precipitates, which may be isolated by filtration. It can be freed of a small proportion of free selenium by extraction with neutral sodium sulfite solution. The product is halogen-free, contains about 26% selenium and gives an orange-red solution in sulfuric acid. It appears to be identical with the dianthraquinonyl-diselenide obtained according to Example 2 of German Patent No. 264,941, and is obtained in nearly quantitative yield.

Example 3

A mixture of 28.7 parts of 2-bromo-anthraquinone, 8.7 parts of selenium powder, and 3 parts of aluminum grains is introduced into 100 parts of ethyl alcohol and the slurry heated to 70° C. A solution of 25 parts of sodium hydroxide in 80 parts of water is added uniformly over a period of four hours, the temperature being maintained at 70–75° C. The mass is then heated to reflux for an hour, diluted with an equal volume of hot water, filtered and the very small amount of residual insoluble material washed with warm water to extract all remaining selenolate. The filtrate and washings are of an intense red-violet color. Acidification gives a yellowish-green precipitate which becomes orange-yellow upon drying. The dry product gives a strong red-violet coloration in sulfuric acid. It is obtained as bright yellow needles by recrystallization from nitrobenzene and contains the theoretical proportion of selenium for 2-anthraquinone-selenol. It melts at about 264° C. and is apparently identical with the product of Example 1 of German Patent No. 264,941.

Example 4

30.9 parts of Bzl-bromo-benzanthrone, 8.7 parts of selenium and 3 parts of aluminum (grains) are mixed and introduced into 100 parts alcohol. The slurry is heated to 65–70° C. and at this temperature, under good agitation, a solution of 35 parts of potassium hydroxide in 80 parts of water is added over a period of 2 hours. Toward the end of this procedure, the temperature is allowed to rise to reflux point and is maintained at this temperature for ½ hour. Upon dilution with an equal volume of hot water and filtration to remove a small proportion of Bzl,Bzl'-dibenzanthronyl selenide, an intense violet solution of potassium Bzl-benzanthrone-selenolate is obtained. The filtrate is readily oxidized to a dull yellow solid by aeration, which is most probably Bzl,Bzl'-dibenzanthronyl-diselenide. The latter may be reduced by sodium sulfide solution to give a solution of the sodium salt of Bzl-benzanthrone-selenol which may be salted out as violet needles by means of common salt and filtered off. Oxidation of the purified sodium-Bzl-benzanthrone-selenolate gives the diselenide as a rich yellow solid. It dissolves readily in sodium sulfide solution with an intense violet color and in sulfuric acid with a dark reddish-blue color.

It will be understood that many variations and modifications are possible in our preferred mode of operation without departing from the spirit of this invention. For instance, instead of selenium, an equivalent quantity of selenium oxide or selenious acid may be used, since these will be readily reduced under the conditions above described. Instead of ethyl alcohol, other alcohols may be used, for instance, methyl alcohol. Numerous other variations may be practiced within the spirit of this invention, as will be readily understood by those skilled in the art.

We claim:

1. The process of producing an aryl-selenol compound which comprises suspending an organic halide of the anthraquinone series in an alcoholic medium together with a reducing metal and a compound of the group consisting of selenium, its oxides and its oxy-acids, warming up the mass, and adding gradually a solution of a caustic alkali.

2. The process of producing an aryl-selenol compound which comprises suspending an organic halide of the anthraquinone series in an alcoholic medium together with selenium and aluminum, heating the mass to about 60-80° C. and adding an aqueous solution of a caustic alkali.

3. The process of producing an aryl-selenolate of the anthraquinone series which comprises suspending a halogen compound of the anthraquinone series in an alcoholic medium in the presence of finely divided selenium and aluminum, heating the mass to a temperature between 60 and 80° C. and adding gradually an aqueous solution of a caustic alkali.

4. The process of producing an anthraquinone-selenolate, which comprises suspending an anthraquinone-halide in an alcoholic medium in the presence of finely divided selenium and aluminum, heating the mass to a temperature between 60 and 80° C., and adding gradually an aqueous solution of a caustic alkali.

5. The process of producing a Bzl-benzanthrone-selenolate, which comprises suspending a Bzl-benzanthrone-halide in an alcoholic medium in the presence of finely divided selenium and aluminum, heating the mass to a temperature between 60 and 80° C. and adding gradually an aqueous solution of a caustic alkali.

6. A process for preparing a 1-selenium derivative of 2-amino-anthraquinone, which comprises suspending substantially 100 parts of 1-chloro-2-amino-anthraquinone, 33 parts of selenium powder, and 11 parts of finely divided aluminum in 280 parts of alcohol and 100 parts of water, heating the mass to about 70-75° C., adding gradually a solution of substantially 83 parts of sodium hydroxide in 166 parts of water over a period of 2 to 6 hours, and refluxing the mass until a test sample shows no more yellow material.

7. A process as in claim 6, in which the final mass is diluted with a concentrated salt solution to precipitate 2-amino-anthraquinone-1-sodium-selenolate.

8. A process as in claim 6, in which the final mass is oxidized to precipitate 2,2'-diamino-1,1'-dianthraquinonyl-diselenide.

9. A process of preparing a Bzl-selenium derivative of benzanthrone which comprises suspending substantially equivalent proportions of Bzl-bromo-benzanthrone and selenium and an excess of aluminum in a quantity of alcohol sufficient to produce a slurry, heating the mass to about 65-70° C., adding gradually an excess of potassium hydroxide in the form of a concentrated aqueous solution, over a period of about 2 hours, and continuing the heating until the reaction is substantially complete.

10. A process as in claim 9, in which the final mass is diluted, filtered and aerated to precipitate Bzl,Bzl'-dibenzanthronyl-diselenide.

11. In the process of preparing an anthraquinone-selenol compound by reacting an anthraquinone-halide with selenium in the presence of a reducing agent and an alkali in aqueous alcoholic medium, the step which comprises first mixing the anthraquinone-halide, selenium, reducing agent and suspending medium and then adding the alkali.

12. In the process of preparing a benzanthrone-selenol compound by reacting a benzanthrone-halide with selenium in the presence of a reducing agent and an alkali in aqueous-alcoholic medium, the step which comprises first mixing the benzanthrone-halide, selenium, reducing agent and suspending medium and then adding the alkali.

13. In the process of preparing an anthraquinone-selenol compound by reacting an anthraquinone-halide with selenium in the presence of a reducing agent and an alkali in aqueous-alcoholic medium, the step which comprises first mixing the anthraquinone-halide, selenium, reducing agent and suspending medium and then feeding in a solution of the alkali at a rate insufficient to cause violent reaction.

14. In the process of preparing a benzanthrone-selenol compound by reacting a benzanthrone-halide with selenium in the presence of a reducing agent and an alkali in aqueous-alcoholic medium, the step which comprises first mixing the benzanthrone-halide, selenium, reducing agent and suspending medium and then feeding in a solution of the alkali at a rate insufficient to cause violent reaction.

ALEXANDER J. WUERTZ.
DONALD P. GRAHAM.
MELVIN A. PERKINS.